United States Patent
Paul et al.

(10) Patent No.: US 8,511,567 B2
(45) Date of Patent: Aug. 20, 2013

(54) SMART CARD CHIP ARRANGEMENT

(75) Inventors: Philip C. Paul, Cambridgeshire (GB);
Simon Tam, Cambridgeshire (GB);
Simon W. Moore, Cambridgeshire (GB)

(73) Assignees: Seiko Epson Corporation, Tokyo (JP);
Cambridge Enterprise Ltd., Cambridge (GB)

( * ) Notice: Subject to any disclaimer, the term of this patent is extended or adjusted under 35 U.S.C. 154(b) by 748 days.

(21) Appl. No.: 12/230,929

(22) Filed: Sep. 8, 2008

(65) Prior Publication Data
US 2009/0065592 A1    Mar. 12, 2009

(30) Foreign Application Priority Data

Sep. 12, 2007 (GB) .................................. 0717783.5
Sep. 14, 2007 (GB) .................................. 0718001.1

(51) Int. Cl.
*G06K 19/06* (2006.01)
(52) U.S. Cl.
USPC ........................................... 235/492; 235/451
(58) Field of Classification Search
USPC .......................................... 235/451, 487, 492
See application file for complete search history.

(56) References Cited

U.S. PATENT DOCUMENTS

| | | | | |
|---|---|---|---|---|
| 5,912,618 | A * | 6/1999 | Maugars | 340/520 |
| 6,555,411 | B1 | 4/2003 | Bao et al. | |
| 7,005,733 | B2 | 2/2006 | Kömmerling et al. | |
| 7,919,772 | B2 * | 4/2011 | Furukawa et al. | 257/40 |
| 2002/0135379 | A1 * | 9/2002 | Moreaux et al. | 324/500 |
| 2003/0096441 | A1 * | 5/2003 | Kim | 438/57 |
| 2006/0112436 | A1 * | 5/2006 | Modave | 726/34 |
| 2006/0214153 | A1 * | 9/2006 | Ikezawa et al. | 257/40 |
| 2007/0004100 | A1 * | 1/2007 | Maekawa et al. | 438/149 |
| 2008/0029930 | A1 * | 2/2008 | Ito et al. | 264/272.17 |
| 2008/0080111 | A1 * | 4/2008 | Lin et al. | 361/56 |
| 2010/0295135 | A1 * | 11/2010 | Masuoka et al. | 257/390 |

FOREIGN PATENT DOCUMENTS

WO    WO 01/50530 A1    7/2001

OTHER PUBLICATIONS

Kömmerling et al., "Design Principles for Tamper-Resistant Smartcard Processors," *Proceeds of the USENIX Workshop on Smartcard Technology*, May 10-11, 1999, pp. 9-20.
Oikonomakos et al., "Implementing Cryptography on TFT Technology for Secure Display Applications," *LNCS Proceedings of the 7th Smart Card Research and Advanced Application IFIP Conference*, Apr. 2006, pp. 32-47.
Baude et al., "Pentacene-based radio-frequency identification circuitry," *Applied Physics Letters*, vol. 82, No. 22, Jun. 2, 2005, pp. 3964-3966.
Wang et al., "Nanoscale organic and polymeric field-effect transistors as chemical sensors," *Analytical and Bioanalytical Chemistry*, vol. 384, 2006, pp. 310-321.

* cited by examiner

*Primary Examiner* — Ahshik Kim
(74) *Attorney, Agent, or Firm* — Oliff & Berridge, PLC

(57) ABSTRACT

A smart-card chip arrangement comprises: a smart-card chip (148); an organic semiconductor layer (166, 168, 170, 172) disposed on a surface of the chip, and at least one transistor (150, 152, 154, 156) formed in the organic semiconductor layer. The at least one transistor is configured so as to enable an invasive attack on the chip to be detected.

12 Claims, 9 Drawing Sheets

SMART CARD CHIP ARRANGEMENT

BACKGROUND OF THE INVENTION

An aspect of the present invention relates to a smart card chip arrangement and a method for protecting a smart-card chip arrangement from unauthorized tampering.

Smart cards are used for a multitude of applications and, in order to protect the user or provide identification for the relevant application, they generally perform some form of encryption or decryption. To this end, a secret key is stored on the chip to render the cryptographic function unique. Attacks from unauthorised parties aim to retrieve this secret key and hence allow the attacker to duplicate or otherwise misuse the smart card. There are two classes of attack: non-invasive and invasive. The present invention is able to find a solution to the latter.

Invasive attacks on smart cards are performed by partially or completely removing the packaging of the microchip of the smart card. The depackaging step may be achieved using acids, solvents, laser cutters, or chemical mechanical polishing. A comprehensive description of the various techniques employed is given in the paper "Design Principles for Tamper-Resistant Smartcard Processors" by Oliver Kömmerling and Markus Kuhn, Proc. of the USENIX Workshop on Smartcard Technology, Chicago, 10-11 May, 1999, pp. 9-20. Once the microchip has been depackaged, attacks are conducted by probing metal tracks. A focus ion beam (FIB) technique could be employed to drill fine holes in the insulating layer in order to expose fine metal tracks without disturbing other components.

A standard countermeasure against invasive attacks is to cover the chip surface with a metal protection grid. More specifically, the topmost metal layer of the microchip is patterned to cover the chip with a meandering grid. This grid prevents access to the circuitry below and also shields the chip circuitry from electromagnetic emissions, which may leak sensitive information (see, e.g., the Dallas DS5002FPM secure microprocessor). Damage to the protection grid is detected, which triggers an alarm and thus causes the chip to refuse further operation.

A second method for protecting the encryption keys is to randomly distribute small particles directly into the packaging of the microchip. The cryptographic key is then derived from measuring the distribution of these particles. To achieve this, the chip includes sensors that are sensitive to at least one physical property of the particles (e.g. magnetism). If the packaging is damaged or removed, the encryption key is lost. This structure is the subject of U.S. Pat. No. 7,005,733 by Kömmerling et al.

A drawback with the use of metal protection grids is that the depackaging procedure leaves the protection grid intact. Generally speaking, it is necessary to actively break the metal protection grid in order to trigger the alarm. However, since the feature size of the metal grid is much bigger than what the FIB can achieve, it is highly likely that the grid will be unable to provide sufficient protection (as demonstrated by Kömmerling and Kuhn in the above-mentioned paper). A small hole can be excavated between grid lines to expose signal wires for probing by the attacker, without triggering the alarm.

As regards the particle-distribution technique, this solution is elegant in principle, but requires a multitude of sensors to be positioned on the chip surface. This is expected to consume significant area on the chip and complicate routing, not least because metal wires running above a sensor will shield it from the relevant property of the packaging, thereby defeating the purpose.

BRIEF SUMMARY OF THE INVENTION

In accordance with a first aspect of the present invention, there is provided a smart-card chip arrangement, comprising: a smart-card chip; an organic semiconductor layer disposed on a surface of the chip; and at least one transistor formed in the organic semiconductor layer; wherein the smart-card chip arrangement is configured such as to enable an invasive attack on said chip to be detected.

The at least one transistor may be configured as a bridge circuit comprising two branches, each having two series-connected transistors, said branches being connected in parallel across a power supply, and the nodes interconnecting the pairs of series-connected transistors in respective branches constituting respective first and second output nodes of the bridge.

The gates of the transistors may be connected to a random waveform generator and a comparator means may be provided, having inputs, which are connected to the first and second output nodes of the bridge, the comparator means, in use, providing a comparison signal, which is a comparison of the voltages on the first and second output nodes.

The comparator means may be configured to detect a difference between the voltages on the first and second output nodes. Alternatively, the comparator means may be configured to detect a ratio of the voltages on the first and second output nodes.

The smart-card chip arrangement may further comprise a memory for storing a value of said comparison signal, which is a reference value, the comparator means being configured to compare the comparison signal with the reference value.

Pairs of said transistors, each pair consisting of a transistor from each of the two branches, may be supplied with the same random waveform.

The sizes of the transistors in each pair may be matched.

All of the transistors may be supplied with the same random waveform and the sizes of all of the transistors may be matched.

Preferably, the random waveform generator is a pseudo-random waveform generator.

The memory may contain a single reference value. The single reference value may correspond to the comparison signal in a balanced state of the bridge circuit. Alternatively, the memory may contain a plurality of reference values corresponding to values of the comparison signal existing at discrete points in time.

The memory may store a number of pre-key bits and the comparator means may be configured to perform an algorithm involving the comparison signal and the pre-key bits, the algorithm producing a cryptographic key employed by the chip.

The power-supply rails and the output nodes of the bridge may be formed in a metal layer inside the chip and adjacent the surface of the chip; the gates of the transistors may be formed in a metal layer on the surface of the chip; a gate insulator layer may be formed on the gates, and the channels of the transistors may be formed in an organic semiconductor layer disposed on the gate insulator layer.

The power-supply rails, the output nodes and the channels may be configured as an interdigitated arrangement.

The at least one transistor may be encapsulated in an encapsulation layer and the smart-card chip arrangement may be configured such that, when the encapsulation layer is rendered non-intact, the properties of the at least one transistor are changed.

The encapsulation layer may include a volatile material which is sensed by the at least one transistor in an intact state of the encapsulation layer, but is not sensed when the encapsulation layer is not intact. Alternatively, the at least one transistor may be configured such as to sense a property of the environment outside the encapsulation layer.

The at least one transistor may be configured as a ring oscillator circuit comprising an odd number of inverter stages connected in series, and a time-delay detector may be provided for determining a time delay between the appearance of an oscillation signal on one node between two adjacent inverter stages and the appearance of the same oscillation signal on another node between two adjacent inverter stages. The smart-card chip arrangement may further comprise a memory for storing a value of the time delay, which is a reference value, the time-delay detector being configured to compare the determined time delay with the already existing reference value.

The at least one transistor may be configured as a memory array for storing bits of a cryptographic key employed by the chip.

The gates of the transistors may be formed in a metal layer of the chip adjacent the chip's surface, a passivation layer of the chip forming the gate insulation layer.

The sources and drains of the transistors may be connected to respective buses, which are connected to a sensor circuit.

The gates of the transistors may be formed in a metal layer disposed on a gate insulation layer, the gate insulation layer being provided on the surface of the chip.

The gate insulation layer of each transistor may have one of at least two different leakage characteristics.

The smart-card chip arrangement may further comprise a control circuit, which is arranged to apply a voltage to each of the gates of the transistors, to determine an output voltage of the transistors after a predetermined time period, and to compare the output voltage with a reference voltage, thereby providing an indication of the logic state of each of the transistors.

The at least one transistor may be configured as a sensor transistor, able to sense a property of its environment either when no attack has taken place, or when an attack has taken place, and the smart-card chip arrangement may further comprise at least one reference transistor, the smart-card chip arrangement being configured such that a property of the at least one sensor transistor is compared with a property of the at least one reference transistor, and an indication is provided, on the basis of the comparison, as to whether or not an attack has taken place.

The smart-card chip arrangement may further comprise, in one or more parts of the chip's surface not occupied by the at least one transistor, an organic conductive layer as part of a passive protection arrangement. The organic conductive layer may be an organic semiconductor layer or an organic conductive polymer. The organic conductive layer may be disposed on the chip surface in a grid configuration.

The smart-card chip arrangement may further comprise a data-detector circuit connected to the first and second output nodes of the bridge, the data-detector circuit being configured to convert voltages appearing on the output nodes into a stream of data bits.

First and second current sources may be connected in series with respective branches of the bridge, the first and second current sources being controlled such as to provide time-varying currents in the branches, thereby to provide time-varying voltages on the output nodes.

The data-detector circuit may comprise: a difference amplifier; first and second comparators and a NAND gate, inputs of the difference amplifier being connected to respective said first and second output nodes, an output of the difference amplifier being connected to a non-inverting input of the first comparator and to an inverting input of the second comparator, an inverting input of the first comparator and a non-inverting input of the second comparator being fed, in use, with first and second reference voltages, respectively, and outputs of the first and second comparators being connected to respective inputs of the NAND gate.

The smart-card chip arrangement may comprise: first, second, third and fourth contacts formed in a metallization layer of the chip; an organic semiconductor layer, the ends of which are connected to the first and second contacts; an insulator layer disposed on top of the organic semiconductor layer; an organic conductive layer disposed on top of the insulator layer, the ends of the organic conductive layer being connected to the third and fourth contacts. The organic conductive layer may be an organic semiconductor layer.

In a second aspect of the present invention, a method is provided for protecting a smart-card chip arrangement from unauthorized tampering, the smart-card chip arrangement comprising: a smart-card chip protected by a cryptographic key; an organic semiconductor layer disposed on a surface of the chip, and at least one transistor formed in the organic semiconductor layer; the method comprising the steps of: performing a self-characterization process, in which an initial signal dependent on a property of the at least one transistor before tampering is derived; performing one or more subsequent tests on the smart-card chip arrangement in order to derive subsequent signals dependent on the property of the at least one transistor; comparing the subsequent signals with the initial signal, and, if the subsequent signals differ substantially from the initial signal, providing to the chip a signal indicative of the tampering.

In a third aspect of the invention, a method is provided for protecting a smart-card chip arrangement from unauthorized tampering, said smart-card chip arrangement comprising: a smart-card chip protected by a cryptographic key; an organic semiconductor layer disposed on a surface of the chip, and at least one transistor formed in the organic semiconductor layer; said method comprising the steps of: establishing an initial value of said key before tampering, said initial value being dependent on determined properties of said organic conductive layer and on the value of a predetermined pre-key, said initial key value acting as said cryptographic key for the purpose of subsequent transactions involving the smart-card chip; in a subsequent transaction, establishing a subsequent value of said key in the manner defined for establishing its initial value, and using said subsequent key value as said cryptographic key, whereby, if said subsequent value is different from said initial value, the transaction is refused.

The properties of said organic conductive layer may be determined as an output signal of said at least one transistor, and said initial and subsequent key values may be derived by digitizing said output signal and combining the digitized output-signal value with a plurality of pre-key bits representing said pre-key value. This combining process may be realized by XORing the digitized output-signal value with the pre-key bits.

The smart-card arrangement proposed by the present inventors is based on the use of an organic semiconductor protection layer. Organic materials are damaged by all of the depackaging techniques that are currently employed and can therefore provide excellent protection against tampering. Furthermore, a preferred embodiment of the invention deposits the organic protection layer as a back-end process—that is, the structure is made after the chip has been fabricated. This means that a standard smart-card chip can be obtained and the organic protection layer deposited on a surface of this standard chip. Since therefore minimal changes have to be made to the chip itself, costs are reduced.

Various materials may be employed for the organic semiconductor layer. For example, pentacene is a semiconducting molecular material, which is usually deposited by thermal evaporation under vacuum conditions. It is also possible to deposit liquid precursors and subsequently anneal the precursors to form pure pentacene. An alternative material is P3HT (poly(3-Hexylthiophene)) or F8T2 (poly(9,9-dioctylfluorene-co-bithiophene)). The above list of materials is by no means exhaustive, there being others that may equally well be used in the present application.

It is preferred that the organic protection layer be combined with an outer layer (e.g. a resin) to form a packaging layer enclosing the overall device (e.g. a smart card), such that, when the packaging layer is damaged during a tampering process or an invasive attack, the organic material is destroyed or degrades to such an extent that the process or attack is detected electronically.

In general, to provide good protection, the protection layer must be sure to be damaged in an attack and its integrity must be easily verifiable. Ideally also, any signalling that takes place must be difficult to mimic by an attacker. The protection layers provided by the various embodiments of the present invention aim to meet these criteria.

The present invention includes transistor circuits as part of the organic tamper-protection layer. The advantage of this lies in the increased functionality and complexity which the layer can offer. Active circuits on the protection layer allow logic functions or interfacing/driver functionality to be included, which are intimately bound to the smart card chip. For example, such active circuits can be used to drive display circuits on a secure display device—see the paper by P. Oikonomakos, J. J. Fournier and S. W. Moore, "Implementing Cryptography on TFT Technology for Secure Display Applications", in the LNCS Proceedings of the 7th Smart Card Research and Advanced Application IFIP Conference (CARDIS'06), LNCS 3928 pp. 32-47, April 2006). If an attack, as mentioned earlier, is carried out, this functionality will be lost or severely degraded, thus introducing an element of tamper evidence to the device (this is in addition to enabling the chip to detect tampering). By including functional circuits as well as tamper-sensing circuits, the layer may be made multi-functional. In addition to increasing functionality, the sensitivity of the layer can be increased, since full transistor structures are more likely to be damaged than simple wire structures. In particular, signal gain is possible in active devices, whereby a small change in transistor characteristics or in transistor input-signal levels can result in a large output signal change, which is easier to detect. Furthermore, transistor structures made from organic materials, such as pentacene, P3HT, or F8T2, are inherently more sensitive to environmental damage, as their characteristics depend on a multitude of finely-balanced parameters.

BRIEF DESCRIPTION OF THE DRAWINGS

Embodiments of the invention will now be described, by way of example only, with reference to the drawings, of which.

DETAILED DESCRIPTION OF EMBODIMENTS OF THE INVENTION

Figure 1:
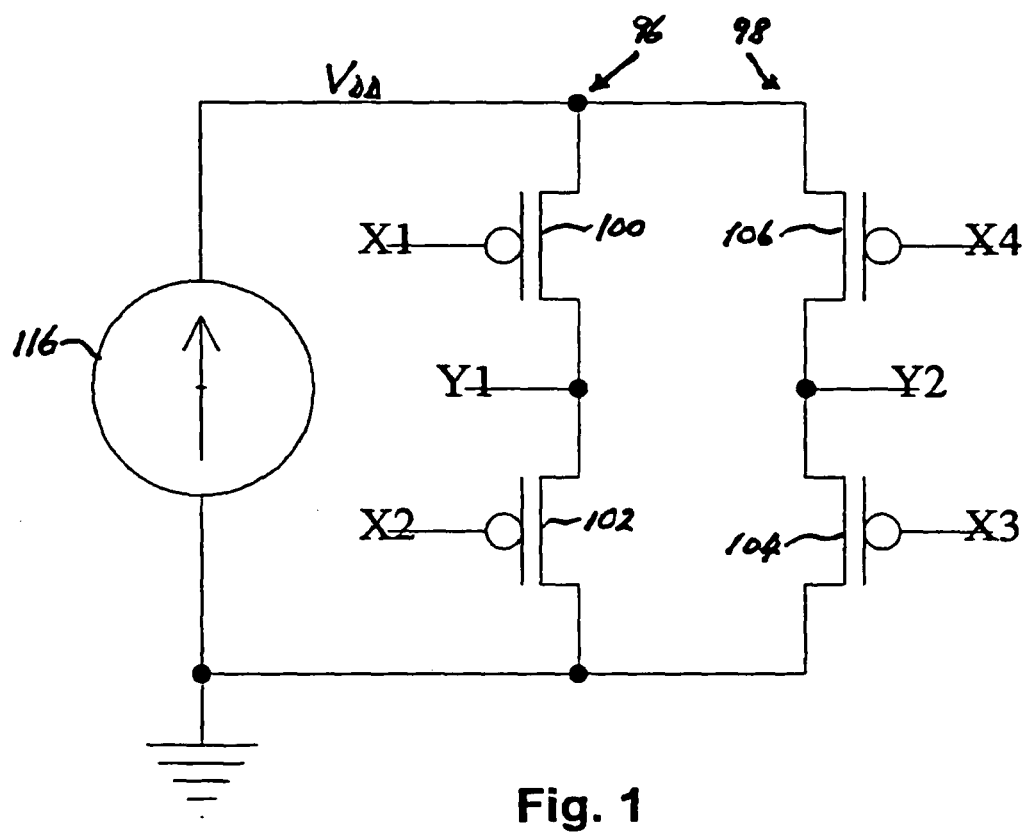
FIG. 1 is a circuit diagram of a first embodiment of a smart-card chip arrangement according to the present invention.

An example of a simple analogue embodiment of the active tamper protection layer is shown in FIG. 1. This embodiment comprises a bridge configuration consisting of transistors 100, 102, 104 and 106. Transistors 100 and 102 form one branch 96 of the bridge, while transistors 104 and 106 form the other branch 98 of the bridge. These branches are connected in parallel to power rails VDD and GND, which are generated by a DC supply 116, as shown. The inputs of the bridge are constituted by the gates X1 to X4 of the transistors, while the outputs of the bridge are constituted by nodes Y1, Y2 joining respective pairs of transistors 100, 102 on the one hand and 104, 106 on the other. Gates X1 to X4 are connected to output pins of the smart card chip, while nodes Y1 and Y2 are connected back to input pins of the smart card chip. The bridge thus maps signals applied to X1-X4 to voltages at Y1 and Y2. The individual characteristics of transistors 100, 102, 104 and 106 render the mapping of voltages unique, thus allowing the integrity of the transistors (and hence the protection layer) to be determined.

A particular property of a bridge, such as shown in FIG. 1, is the so-called "balance point". This is a state, in which the voltages at nodes Y1 and Y2 are equal and exists when the voltages on the gates are at specific values. It is also the most sensitive condition and can be sensed easily. If the sizes of all transistors are matched, or transistors 100, 104 and 102, 106 are matched pairwise, or if the ratio of the widths of transistors 100 and 102 is equal to that of transistors 104 and 106, then the balance point will occur for identical gate voltages at X1 and X4 and for identical voltages at X2 and X3. On the other hand, it is also possible to use transistors with deliberately differing and unique characteristics for each protected smart card chip. This can be achieved by making use of both naturally occurring and deliberate variations of material properties and deposition conditions. In this case, the balance condition will correspond to different voltages applied to the bridge transistors of the chip. Furthermore, the variations in material properties and deposition conditions may be different for different chips, so that the balance point would correspond to a different pattern of input voltages for different chips.

In a first read-out scheme of the bridge, chosen voltages are applied to the gates X1 to X4 and it is determined whether the bridge is in balance or not. A minimum of two readings is required, one in balance and one out of balance, to ensure an attacker does not short circuit Y1 and Y2, in order to deliberately set the bridge 'in balance'. A second readout scheme monitors the voltages which have to be applied to the gates X1 to X4 in order to achieve balance. Like the first read-out scheme, this scheme ensures that short-circuiting of Y1 and Y2 has no effect, but it has the further advantage that variations in transistor characteristics can be taken into account.

Figure 2:
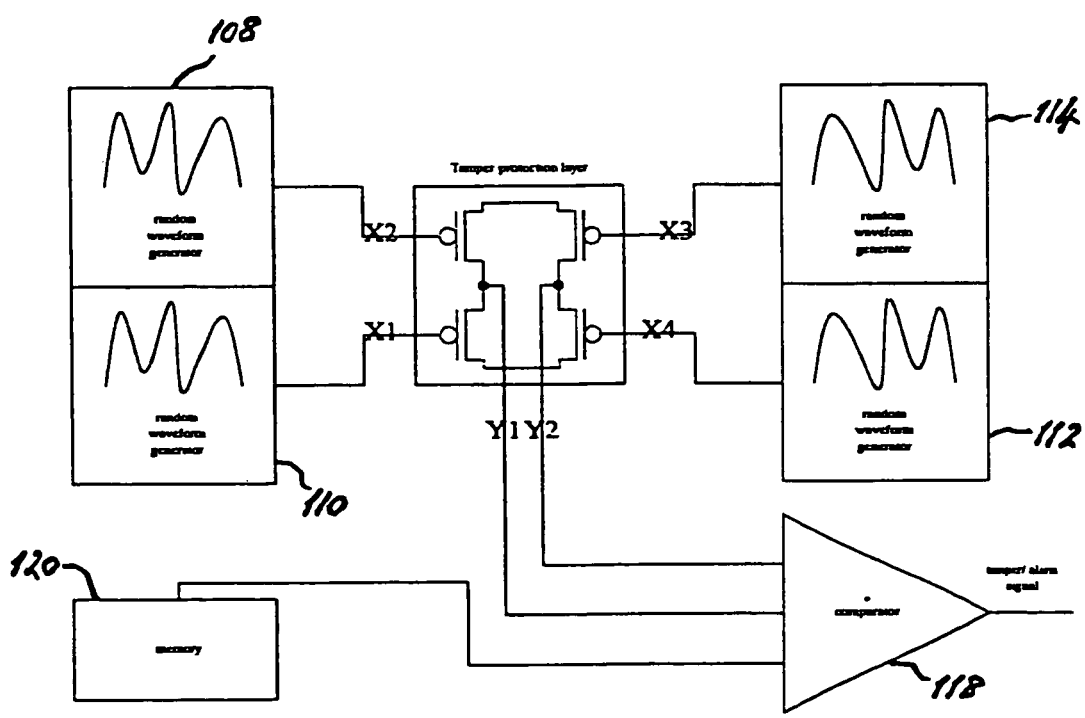
FIG. 2 is a block diagram of a tampering-detection arrangement based on the use of the FIG. 1 circuit.

A third readout scheme will now be described in detail. In this scheme the gate voltages at X1 to X4 are applied either as constant voltages or as a series of pre-selected voltages or, as shown in FIG. 2, as signals of random waveform generated by random waveform generators 108, 110, 112 and 114. These generators form part of the smart-card chip. The voltages on the two centre nodes Y1, Y2 are taken to respective inputs of a comparator 118, a third input of which is fed from a memory 120. The voltages on the nodes Y1, Y2, or the difference or ratio of these voltages, are used as a measure of integrity. The characteristics of the transistors will change as they are damaged in the depackaging process, thereby changing the relative values of the voltages on Y1 and Y2. The voltages at nodes Y1 and Y2 are measured either at fixed points in time (for pseudo-random waveforms) or when pre-chosen voltages appear at the gates X1, X2 and X3, X4 (for random waveforms). Measurements of voltages Y1 and Y2 are taken either at the same time or at different points in time. In the latter case, the first measured value relating to Y1, say, is stored in memory on the chip until the second measurement, relating to Y2, has been taken. For each of the two measurements, the same or different input signals are applied to the gates. A comparison is then performed between these values of Y1 and Y2 in the manner mentioned earlier, e.g. by forming the difference or ratios of these values.

In the first and second readout schemes described earlier, in which a change in balance point is being monitored, the memory 120 will contain a value appropriate for comparison with the comparison of the voltages on Y1, Y2. Where comparator 118 determines the differences of these voltages—which is zero at the balance point—then the memory 120 will also contain the value zero. Thus, in the untampered state, the comparator output will take a first value corresponding to zero difference between Y1 and Y2, and therefore zero in the memory, whereas in the tampered state the balance will be upset and the comparator 118 will output a second voltage value as an alarm. Alternatively, where a ratio of Y1/Y2 is formed in the comparator 118, the memory will contain the value of 1. The comparator 118 will react then in a way similar to its reaction in the case of the formation of the difference between Y1 and Y2. In practice, even assuming the transistors and input waveforms to be such that a perfect balance ought to exist at nodes Y1, Y2, there will be some slight difference in characteristics between the transistors, so that a perfect balance may not be obtained. In this case, an initial characterizing phase is carried out, in which, before the smart card is used, it is powered up, the waveforms applied and the difference or ratio between the voltages on Y1 and Y2 determined. This difference/ratio, which may be other than zero/unity is then written into the memory 120. Subsequently, when the card is put to use, any tampering that may have taken place will change this difference or ratio and result in an alarm at the comparator output. Note that, when the balance point is used as an integrity metric, the memory will contain also the voltages to be applied to gates X1 to X4 in order to achieve at least nominal balance. Also, instead of containing the expected difference or ratio values of the voltages on Y1 and Y2, the memory may contain the absolute expected voltages of Y1 and Y2, which are then compared with the voltage values of Y1 and Y2 actually obtained in any subsequent test. As a number of input-voltage settings can produce balance, several sets of data are preferably stored in the same memory.

The voltages to be stored in memory are ascertained in a pre-characterisation phase of the smart card. Assuming, for example, the second of the above read-out schemes is being employed, then before the card is issued, a series of voltage values are applied to gates X1 to X4 and the values existing at a point in time at which Y1 and Y2 are in approximate balance are stored in memory, together with the relevant absolute values of Y1 and Y2, or the difference or ratio of these absolute values. Then, during use of the smart card, when the user inserts his card into a card reader, a test will be run on the card, in which the same gate input values are applied to the gates and the voltage values on nodes Y1 and Y2 are read and checked against the expected absolute values. Alternatively, the difference or ratios of these read values are compared with the expected difference or ratio values. If these are not the same as the values stored in memory, the chip registers an alarm and further transactions using the card are prevented.

As mentioned in connection with the third read-out scheme, sensing of the node voltages is not limited to identical voltages at Y1 and Y2, though this condition is the easiest to detect. As long as the voltages are not near saturation (close to maximum or minimum possible values), a change in transistor characteristics will result in a measurable voltage change at Y1 and Y2. In fact a test sequence, which is carried out when the user inserts the card into a card reader and which employs different voltage differences of Y1 and Y2, is preferable, in order to ensure that an attacker does not simply short together the contacts Y1 and Y2, in order to achieve balance. Also, the reason why pseudo-random waveforms are preferably applied is to make spoofing (mimicking) more difficult. The balance conditions and/or set voltage-difference conditions would be achieved after known times. The voltages on the nodes Y1 and Y2 could be compared to reference values at set points in time. These reference values are determined in the pre-characterizing phase before the card is used, and are placed in the memory 120. As the applied voltages are pseudo random, the sequence of applied voltages will be identical each time the chip is powered on.

In summary, therefore, either the transistor characteristics and deposition conditions, etc, along with the input waveforms, are such that balance necessarily occurs in the untampered state, or a deliberate difference in characteristics, waveforms, etc., is introduced at manufacture, so that balance occurs only at one or more points in time. Furthermore, in the latter case, either (a) the differences or ratios of the voltages on nodes Y1, Y2 are compared with reference values at different moments in time, or (b) a single difference or ratio is compared with only one reference value at a single point in time, or (c) the point in time (relative to a starting time) at which balance occurs is initially determined and, during a subsequent test when the case is put to use, it is determined if balance occurs at that same point in time. Where balance does not occur, or the expected difference/ratio of voltages on nodes Y1 and Y2 does not occur, an alarm is triggered and further use of the card is disallowed.

As regards the use of random waveforms, it is possible to employ purely random waveforms, as opposed to pseudo-random ones. However, this would require careful monitoring of the input conditions, which is possible in principle, but more complex to implement. One way of doing this is to determine in the characterizing phase when the balance point, or given absolute voltage values, or a given difference/ratio of voltage values, on Y1 and Y2 occurs and to store the values of gate voltages X1 to X4 obtaining at that time. Subsequently, an integrity check is triggered whenever the card is used, which waits for these same gate input conditions to arise. When these conditions do arise, the absolute voltage values or difference/ratio is checked and, if this is not as expected (as stored in memory 120, for example), an alarm is triggered and further use of the card stopped. Alternatively, the state of voltages Y1 and Y2 may be monitored and, when these match the pre-characterisation values stored in memory, the gate voltages are checked against the corresponding voltages stored in memory and, if these do not match, the alarm is triggered, and so on.

As mentioned earlier, it is also feasible to apply constant voltages to gates X1 to X4. This, however, is disadvantageous, since the voltages on nodes Y1 and Y2 would then also be constant, in which case an attacker would merely have to apply different voltages to the pads of Y1 and Y2 until the tamper check succeeds. By contrast, when varying input waveforms are employed, and therefore varying voltages occur at Y1 and Y2, it is necessary for the attacker to know the appropriate timing and sequence of voltage necessary to "unlock" the chip.

Instead of arranging for the comparator 118 in FIG. 2 to provide a PASS/FAIL indication during a test phase, when the card is inserted into a card reader, it is possible to arrange for the comparator to output the card key itself. In this case, the absolute voltage value or voltage difference or ratio on nodes Y1 and Y2 is input along with the output of memory 120 to a transform logic circuit, which takes the place of the comparator 118 in FIG. 2. The memory contains a series of so-called pre-key bits and the transform logic circuit performs an algorithm based on a combination of these pre-key bits and the voltage absolute-value/difference/ratio, this algorithm yielding at the output of the transform logic circuit the cryptographic key. The pre-key bits may be predetermined values or purely random. The key at the output of the transform logic circuit is determined during the characterizing phase before the card is issued to the user. Depending on the application of the card that is secured in such a way, authentication of a card would take place in a way that uses the key, which is derived each time the chip is powered up. If the value of the key remains constant, continued use of the card is allowed. Where an attack has taken place, the voltage absolute-value/difference/ratio at nodes Y1 and Y2 will be different, resulting in a different key, which consequently fails the test.

A simple method of deriving multiple bits from this arrangement is to apply a series of (pre-selected) voltages to X1 to X4, and to use each output-voltage absolute-value/difference/ratio as bits of the key. This would require the analogue voltages (or voltage difference/ratio) of Y1 and Y2 to be digitised. These values would then be XORed (i.e. exclusive-ORed) with the pre-key bits to give the cryptographic key.

As regards the non-volatile memory used for memory 120, it is preferred to use a write-once memory-for this. This is a memory, which can only be written to once, any repeated attempts to write to it resulting in corrupted data in the memory. An example of a write-once memory is described in U.S. Pat. No. 6,804,136 by L. Forbes.

Figure 3:
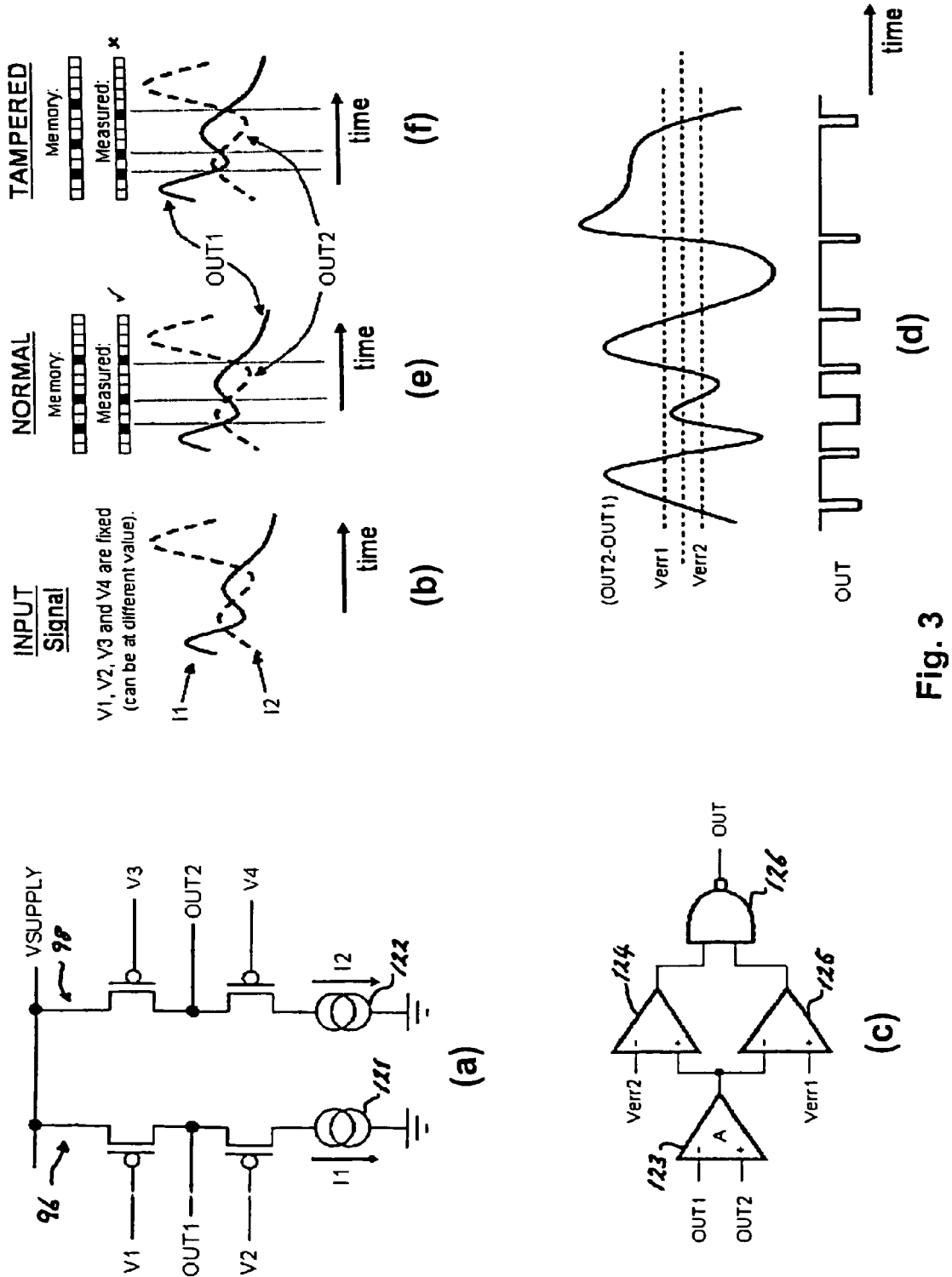
FIG. 3(a) is a realisation of the first embodiment involving changing bridge currents.
FIG. 3(c) is an example of a bit-stream detector for use in the circuit of FIG. 3(a), and FIGS. 3(b), 3(e) and 3(f) are waveform diagrams relating to the mode of operation of the bit-stream detector shown in FIG. 3(c)
FIG. 3(d) shows the response of the circuit illustrated in FIG. 3(c)

A more detailed realisation of the third read-out scheme mentioned above will now be described with reference to FIGS. 3(a)-3(f). FIG. 3(a) shows a bridge circuit similar to that shown in FIG. 1, but in this case the bridge is provided with a pair of current sources 121, 122, giving currents I1 and I2, respectively, in the parallel branches 96 and 98 of the bridge. The values of I1 and I2 are changed in a predetermined way, while the values of V1 to V4 on the gates of the transistors are set at fixed predetermined values. This gives rise to voltages on the bridge output nodes, OUT1 and OUT2, which change in correspondence with the changes in currents I1 and I2. An example of the variation of the currents I1 and I2 is shown in FIG. 3(b). This variation can be provided through the use of a pair of (pseudo-)random waveform generators, as shown in FIG. 2.

As mentioned in connection with the basic bridge circuit of FIG. 1, voltages V1 to V4 and the output voltages OUT1 and OUT2 are connected to circuitry on the chip. More specifically, OUT1 and OUT2 are connected to a circuit such as shown in FIG. 3(c), for example. This circuit comprises a difference amplifier ("diff-amp") 123, two comparators 124 and 125 and a NAND gate 126. OUT1 and OUT2 are fed to the two inputs of diff-amp 123, while the output of diff-amp 123 is fed simultaneously to the non-inverting input of comparator 124 and the inverting input of comparator 125. Reference voltage signals Verr1 and Verr2 are fed to the non-inverting input of comparator 125 and the inverting input of comparator 124, respectively. Verr is the allowable error voltage (tolerance/error margin) in the presence of noise. Preferably, |Verr1|=|Verr2| and Verr2<0<Verr1. A balanced point occurs when Verr2<OUT2−OUT1<Verr1. (Note that, if the band of Verr is zero or less than the magnitude of noise, the crossover point will result in multiple peaks.) Finally, the outputs of comparators 124 and 125 are taken to respective inputs of the NAND gate 126, the output of which is connected to an input terminal of the chip.

The response of this circuit is shown in FIG. 3(d). The upper waveform of FIG. 3(d) shows the changing voltage difference between OUT1 and OUT2, while the lower waveform shows the output of the NAND gate 126. This output signal is a stream of bits indicating the occurrence of zero cross-over with time (where "zero" in this instance is the mid-point between Verr1 and Verr2, i.e. the same noise band on both sides). In a pre-characterising phase, specific voltages are applied to the gates of the transistors and specific current waveforms are supplied as I1 and I2. The resulting bit-stream is then stored in non-volatile memory to create a look-up table, which is unique to the chip. Preferably a number of such look-up tables are provided corresponding to different temperatures, since the characteristics of the bridge circuit and detector circuit will normally change with temperature. The data stored in each look-up table are a series of "1"s and "0"s for discrete points in time. When the card is put into use, the same input voltages and source currents are applied and the bit-stream at the output of the NAND gate 126 is compared with that stored in memory. If the transistors deposited in the protection layer have been tampered with, the difference between the two bit-stream sequences is spotted and an alarm is raised.

FIGS. 3(e) and (f) show this checking process in operation. In FIG. 3(e) the input currents I1, I2 are shown in the untampered state of the circuit—that is, the transistors constituting the current sources 121 and 122 and the bridge have not been damaged in any way. The data excursions, which are stored in memory, match exactly with the corresponding excursions read during use of the card (see the upper portion of FIG. 3(e)). If, now, the card has been tampered with, a situation may arise in which one or both of the current sources 121, 122 is damaged. FIG. 3(f) shows such a situation, in which current source 122 is intact, but current source 121 is not. This creates a change in I1, but not in I2. FIG. 3(f) shows I1 as being of higher average value than normal. This, in turn, gives rise to cross-over points, which are different from the stored crossover points. This can be seen representationally in the upper portion of FIG. 3(f), in which the displacing of two of the cross-over points, relative to their positions in the untampered state in memory, can be clearly seen. As mentioned earlier, this difference in cross-over positions causes an alarm to be given and the card is blocked from further transactions.

An alarm signal will also be issued for situations when one of the transistors, to which gate voltages V1 to V4 are applied, is damaged due to tampering. The damaged transistor will upset the voltage distribution along the corresponding current path. As a result, the time points when balanced points occur will be different from that stored in memory.

Note that, instead of current sources, voltage sources may be used having varying voltage waveforms. Also, the voltages V1 to V4 on the gates do not need to be fixed values. Instead, they too may be changing quantities with time. In that case the changing waveforms on OUT1 and OUT2 will be a composite of the changing currents/voltages on sources 121, 122 and the changing voltages on V1-V4.

Figure 4:
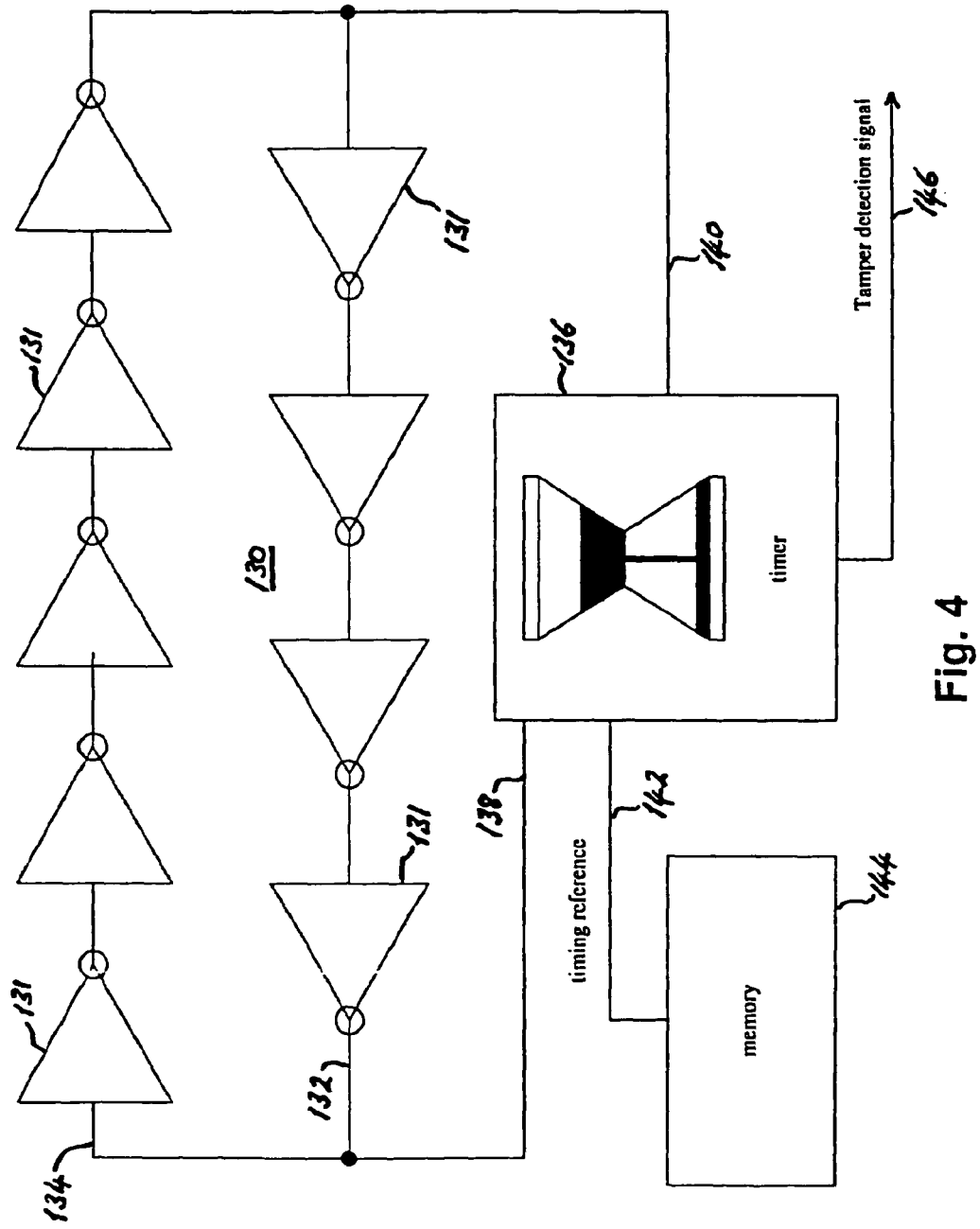
FIG. 4 is a circuit diagram of a second embodiment of a smart-card chip arrangement according to the present invention.

A second embodiment of the present invention is illustrated in FIG. 4. FIG. 4 comprises a ring oscillator circuit 130 consisting of an odd number of inverter logic gates 131 (in this case, nine) connected in series. The output 132 of the final inverter is connected to the input 134 of the first inverter to complete the ring. A timer circuit 136 has two inputs 138, 140 fed from two tapping points around the ring, while a third input 142 of the timer circuit is fed from a memory 144. The timer circuit detects the time delay between successive leading or falling edges of the waveforms on inputs 138 and 140. This time-delay value is combined with the contents of the memory 144 to provide a tamper-detection signal on output 146.

The time delay will be a function of the frequency of oscillation of the ring oscillator, which in turn will vary with the geometry of the ring layout and the transistor (i.e., semiconductor) characteristics. A high transistor mobility and a low input capacitance for each inverter stage will result in a high oscillation frequency. The characteristics of each stage (geometry, transistor layout, material deposition parameters, etc.) and the number of stages between tapping points on the inputs 138 and 140 can be different between chips. This gives a characteristic timing pattern for each chip and makes spoofing more difficult. When one or more of the transistors are damaged during an attack, the timing pattern is altered, providing an indication of such an attack. A ring-oscillator configuration can conveniently be realized in organic TFT (OTFT) technology—see, e.g., "Pentacene-based radio-frequency identification circuitry", by P. F. Baude, et al., Applied Physics Letters, AIP, 2003, 82, pp 3964-3966. As with the first embodiment, the memory 144 is preferably a write-once non-volatile memory.

Figure 5A:
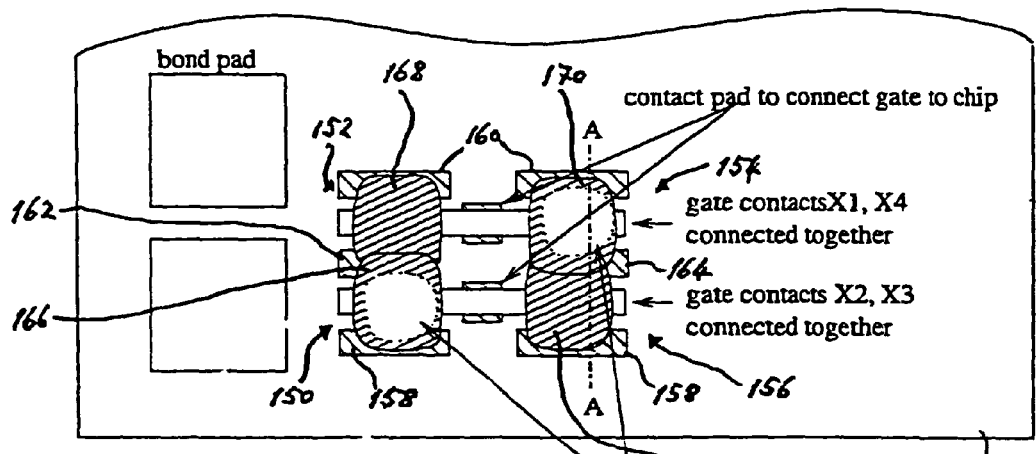
FIGS. 5(a) and 5(b) are top and side views, respectively, of a third embodiment of a smart-card chip arrangement according to the present invention.
Figure 5B:
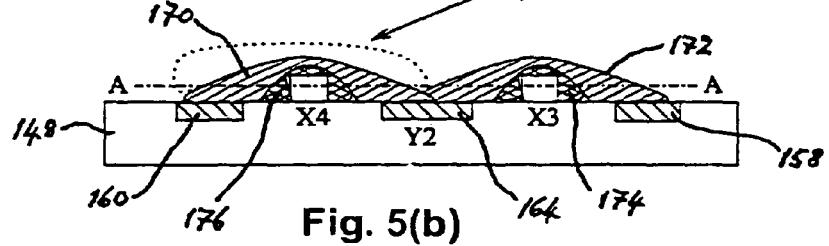

In a third embodiment of the invention discrete sensor structures are employed as tamper detectors. FIG. 5(a) shows a top view of such an arrangement, which is based on the bridge configuration of the first embodiment, and FIG. 5(b) shows a side view looking along line A-A in FIG. 5(a). The bridge, which is disposed on a smart-card chip 148, comprises transistors 150, 152, 154 and 156. The drains of transistors 150 and 156 are connected to GND via pads 158, while the sources of transistors 152 and 154 are connected to VDD via pads 160. The drains of transistors 152 and 154 are connected to the sources of transistors 150 and 156, respectively, to form nodes Y1 and Y2, respectively. Nodes Y1 and Y2 correspond to pads 162 and 164, respectively. The channels of the transistors are formed by organic semiconductor layer portions 166, 168, 170 and 172, which cover respective gate dielectric regions, two of which, 174 and 176, are shown in FIG. 5(b) in respect of transistors 154 and 156. The gate dielectric regions in turn cover respective gates X1 to X4 formed on the surface of the chip. The power lines and the output nodes Y1 and Y2 are formed in the chip itself, adjacent its upper surface. Gates X1 and X4 are connected to each other via a common connecting conductor, and similarly for gates X2 and X3. Thus this configuration corresponds to that of FIG. 1.

In the four-transistor bridge configuration shown, two of the four transistors (either the top left and bottom right, or top right and bottom left) are implemented as sensors, while the other two are implemented as non-sensors. The non-sensing transistors may be rendered insensitive by being encapsulated in a passivation layer. The bridge may either be balanced by default, in which case any change in the characteristics of the two transistors will result in imbalance, or the bridge may be unbalanced by default, becoming either balanced when an attack occurs or unbalanced to a greater or lesser degree.

Instead of employing a bridge structure as a sensor, the present invention also envisages a situation in which individual sensor transistors are associated with reference transistors, which are not used in a sensing capacity. The characteristics of the two transistors are compared, e.g. by applying a fixed voltage to a sensor transistor and its reference transistor and, at the same time, measuring the difference in current through each of these transistors, i.e. the current through their drains and sources. Where the sensing transistor senses, e.g., a normally present volatile material in an encapsulation layer, there will be a finite difference between these two currents, whereas when the sensing transistor senses a not normally existing property of the environment outside the encapsulation layer, there will be an approximately zero difference between these two voltages. This assumes that the layer is intact; the opposite will apply if tampering has occurred.

It should be noted that, instead of using a reference transistor for each sensing transistor, it is possible to employ a single reference transistor, which will suffice to test all the sensing transistors (at least the ones that are the same size).

Whereas in the previous embodiments it has been assumed that a pre-characterisation phase will be required, with initial values of a control quantity (e.g. nodal voltage values, etc., in the bridge circuit) being stored in a memory, the system just described can be set up such that it assumes from the beginning that the currents in the sensing and reference transistors either match or do not match, so that this scheme can get by without a separate memory. Alternatively, the reference transistor and sensing transistor may be of slightly different size or performance, such that, e.g., a slightly higher current passes through the reference transistor in the default/untampered case, in comparison with the current through the sensing transistor. If the chip packaging is subsequently removed, e.g. by tampering, then the conductivity of the sensor will change, so that now the higher current flows through the sensor transistor.

The sensors themselves can be used in one of two modes: either they are used to sense a property that is normally present (i.e. a property of the packaging of the sensor transistor), or they are made to sense a property of the environment, which is normally absent when the packaging is intact. One way of achieving the former is to include within the package a volatile material (e.g. a solvent), which can be detected with the OTFT sensor. In FIGS. 5(a) and 5(b) this material is shown in dotted lines as item 178 associated with a pair of diagonally disposed transistors 150, 154. When the encapsulation is broken in an attack, the material evaporates, thus changing the sensor's response. For the second of the above two modes the sensor may detect the presence of oxygen in the surrounding air. A drawback of this mode is that the environmental property to be detected must be present during an attack. In the case of oxygen, an attacker could break the packaging in an inert nitrogen environment, thereby not triggering a sensor response. Hence the first mode is preferred, especially as it withstands analysis of the chip using FIB or SEM (scanning electron microscope) techniques. This is because these typically require vacuum conditions, which increases the rate of evaporation of any volatile material used.

Figure 6:
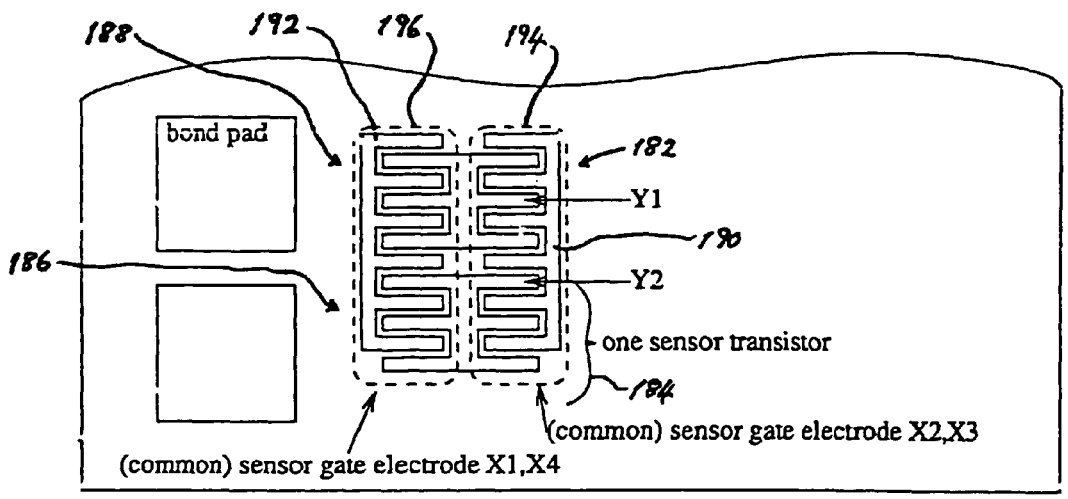
FIG. 6 is a top view of a variant of the arrangement of FIG. 5(a)

A variant of the third embodiment is shown in FIG. 6. In this configuration the transistors are interdigitated in order to increase the chip area covered. There are four transistors, as with the FIG. 5 arrangement, but this time they are orthogonally orientated as a bridge relative to FIG. 5. Thus, the transistors 150, 152, 154 and 156 shown in FIG. 5(a) become transistors 188, 182, 184 and 186 in FIG. 5. The commoned sources 160 of FIG. 5(a) become common source and first power supply rail 190, while the commoned drains 158 of FIG. 5(a) become common drain and second power supply rail 192. Extending between the fingers of rails 190 and 192 are the fingers of a common node Y1 and the fingers of a common node Y2. Joining the common rail 190 and the fingers associated with node Y1 is a channel region belonging to transistor 182, while a channel region belonging to transistor 184 joins common rail 190 and the fingers associated with node Y2. Corresponding channel formations exist with respect to common rail 192 and the fingers associated with nodes Y1 and Y2, respectively. Finally, a gate electrode 194 is disposed either beneath or above the channel regions associated with transistors 182 and 184, and a gate electrode 196 is similarly disposed with respect to the channel regions associated with transistors 186 and 188. In practice, the gate electrodes may be formed adjacent an upper face of the chip (cf. the electrodes 160, 164 and 158 in FIG. 4(b)), with a gate dielectric formed on top of the gate electrodes, the channel regions formed on top of the gate dielectric and the fingers 190, 192, Y1 and Y2 formed on top of the channel regions. Alternatively, the order of the layers may be the opposite of this. This arrangement operates in exactly the same way as the arrangement illustrated in FIGS. 5(a) and 5(b), except that it covers a larger chip area, thereby serving to protect more of the chip surface. It is conceivable to extend the interdigitation so as to cover most of the chip area, which is desired to be protected. Alternatively, a series of smaller interdigitated arrangement, like the one shown in FIG. 6, may be disposed adjacent each other to cover the required area. The latter is preferred, since this promises to be more sensitive to a tamper attempt.

As already mentioned in respect of the interdigitated arrangement of FIG. 6, the bridge and ring arrangements shown in FIGS. 1-5, and indeed also the individual sensor/reference transistor arrangement described earlier, are preferably repeated over as much of the chip surface as necessary, in order to protect the sensitive circuitry within the chip from attack.

A further application of the present invention is as a memory arrangement. Such an arrangement can be made for multiple purposes. For example, it may be used as a replacement to on-chip ROM memory, to store, e.g., configuration data or part of the smart-card's encryption key. Making parts of the key vulnerable to destruction is advantageous in terms of security. However, if the shielding or encapsulation measures of the smart-card chip are not reliable then putting secret data on the surface of a chip could potentially lead to a breach of the chip's security. This may occur for example, if properties of the memory transistors are detectable from outside the packaging, thus enabling a hacker to gain access to the key without the need to depackage the chip. Careful shielding is therefore advisable for this application. A further measure of the present invention is to split the encryption key into two parts. One part lies in the protection layer, while the other is stored in an on-chip memory. When the card is inserted into a card reader by the user, the copy in the protection layer is combined with the copy in the on-chip memory by means of an XOR (exclusive-OR) function. If any changes to the layer have taken place, the encryption key is corrupted, resulting in failure of the smart card device.

Figures 7A, 7B:
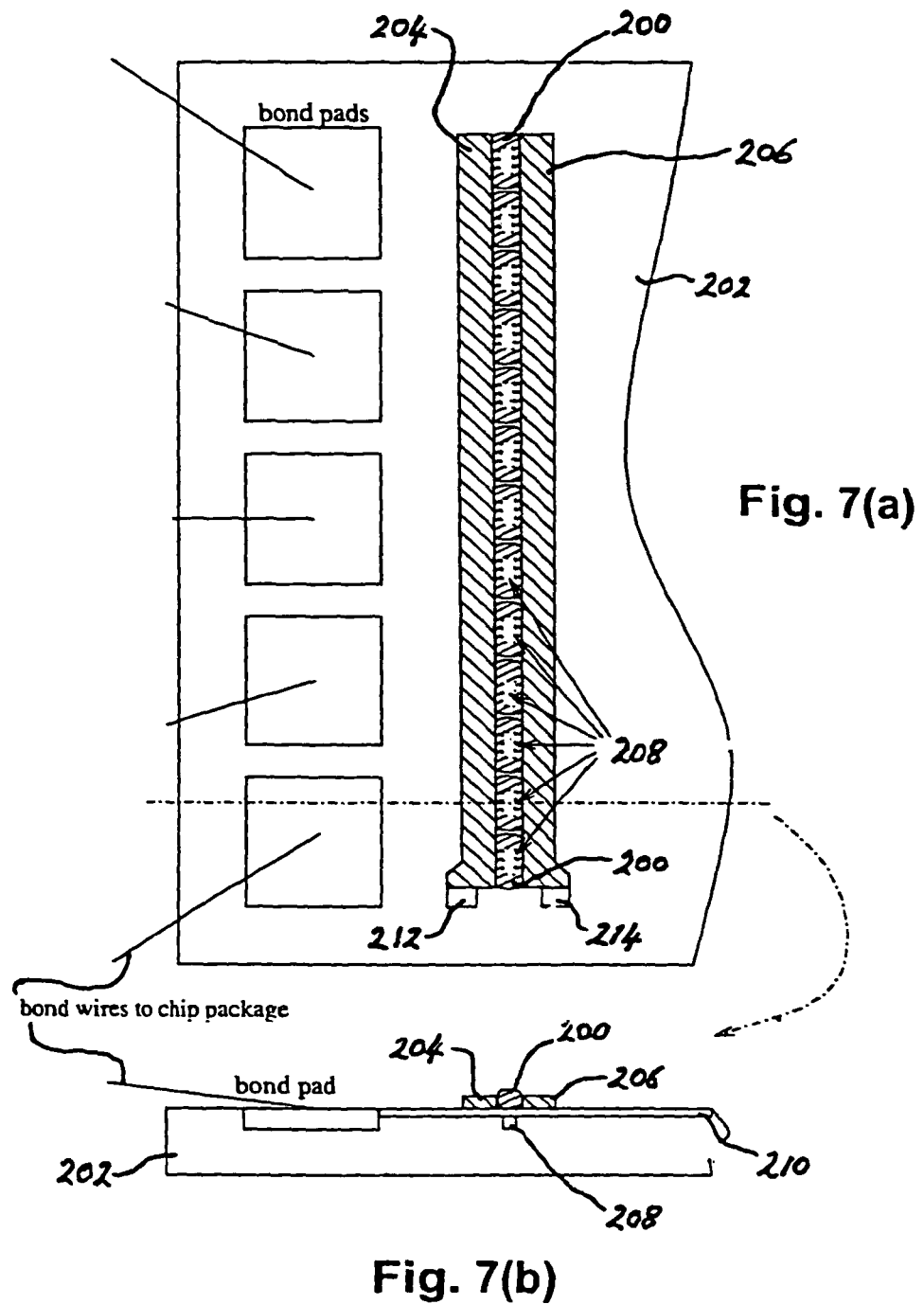
FIGS. 7(a) and 7(b) are top and side views, respectively, of a memory device in accordance with the present invention.

In order to provide a high data density, the memory arrangement may be as shown in FIGS. 7(a) and 7(b). Discrete sections of an organic semiconductor layer 200 are provided as channel regions on the upper surface of a smart-card chip and a common source electrode 204 and a common drain electrode 206 are provided on respective sides of these channel regions on the chip surface. Individual gates 208 are formed as part of the top metal layer of the chip, a chip passivation layer 210 being interposed between the gates 208 on the one hand and the channel regions 200 and electrodes 204, 206 on the other. The source and drain electrodes 204, 206 are terminated in respective contact pads 212, 214, which are taken to respective inputs of a sense amplifier, this amplifier being a part of the chip 202. The data bits are written to and read from the various memory locations in serial form, in view of the common source/drain bussing arrangement.

This arrangement increases the density of the stored data, firstly because the memory transistors are transferred to the tamper-protection layer and, secondly, because the gates of the memory transistors are formed in the topmost metal layer of the chip, similar to the gate electrodes in FIG. 5. This avoids the need for dedicated contact pads for separate gates, which saves chip area and allows the available chip area to be populated by further memory locations. The gate arrangement just described is an example of a "bottom-gate" configuration, such as is disclosed in the paper "Nanoscale organic and polymeric field-effect transistors as chemical sensors" by Wang, L; Fine, D; Sharma, D; Torsi, L. and Dodabalapur, A., Analytical and Bioanalytical Chemistry, 2005, 384, 310-321.

The values of the data bits associated with this memory arrangement are defined as "1" or "0", depending on the presence or absence of a transistor. Thus, this memory is written to on a once-only basis by providing transistors in locations where a "1" is supposed to be. However, since this would almost certainly be detectable from outside the packaging, thereby betraying the key bits to an attacker, a differential scheme may be used. In this scheme, transistor characteristics, which are deliberately varied during manufacture, are compared with a reference transistor. One such characteristic that may be used is the conductivity of the channel regions. Thus if, for example, the conductivity of the transistor channel regions 200 is slightly lower than the conductivity of the reference-transistor channel region, this is taken to be a "0", while identical conductivities signify a "1". In this variant, transistors are provided at all locations, whether corresponding to a "1" or a "0".

Yet a further memory scheme employs transistors having different gate-leakage characteristics. These different characteristics correspond to a data "1" or a data "0". Thus, those transistors which are to store a "1" will be manufactured with a gate-leakage rate within a certain range, while those which are to store a "0" will be manufactured with a gate-leakage rate within a different range. In order to read the data, a fixed charge is deposited at time $t_0$ on the gate, which effectively functions as a capacitor, and then a short time later, at time $t_1$, a check is made to see if the charge is still there. Depending on the gate-leakage characteristics, the charge will either have remained on the gate by time $t_1$, in which case it will have switched its associated transistor ON, or it will have leaked away, resulting in a transistor of reduced conductivity, or even one with no conductivity at all. Thus, to check the charge state, all that is required is to sense the drain current through the individual transistors, or the drain-source resistance.

In practice, the scheme just mentioned would require that the gates of the transistors be not part of the top metallization of the chip, since the gate insulation would then be constituted by the top passivation layer of the chip, which would result in identical leakage characteristics for all of the transistors. Thus the gates should be formed on the surface of the chip, with an intervening separate gate insulation layer being provided on the chip surface for each transistor. These separate layers would be constituted so as to have a leakage characteristic, which resulted in either a slow leakage, whereby the respective transistor was in an ON state after a given time, or a fast leakage, whereby the respective transistor was in an OFF state after the same given time. As already mentioned, these states could be determined by measuring the drain current of the various transistors. Alternatively, if the drain is connected in series with a load resistance, the drain voltage could be sensed.

As with the bridge and ring configurations, the memory configurations just described can be repeated over most or all of the chip surface. Alternatively, there may be a mixture of bridge/ring configurations and memory configurations.

Figure 8:
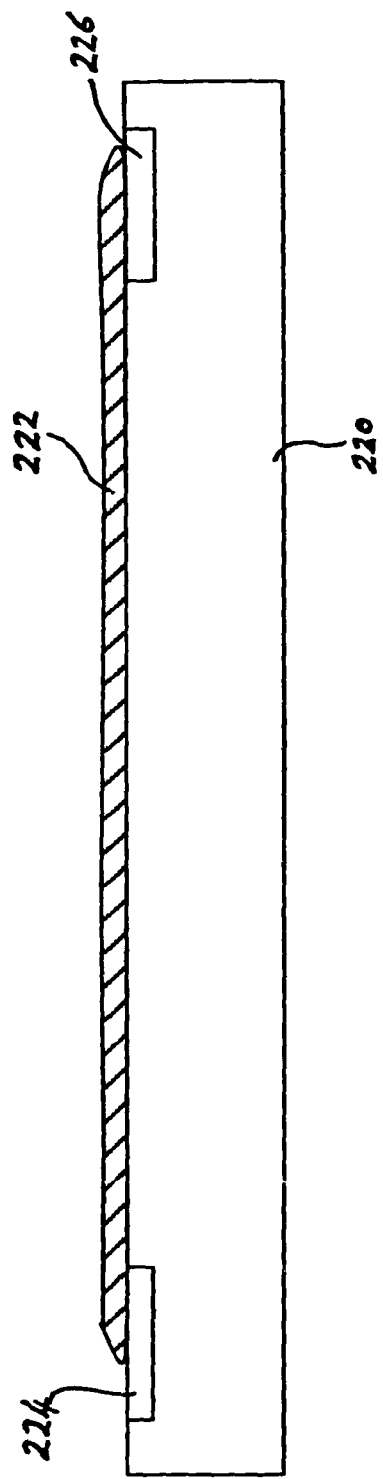
FIG. 8 is a side view of a smart-card chip with an organic conductive layer for use in a passive tamper-protection scheme.

A further alternative is to employ on the same chip any combination of these active configurations together with a passive protection arrangement involving an organic conductive layer. Such a passive protection arrangement is shown in FIG. 8. In FIG. 8 the chip, which is here designated as item 220, has applied to its upper surface an organic conductive layer 222. The organic conductive layer 222 may have conducting or semiconducting properties. A wealth of organic materials are known, which are suitable for use as the passive protection layer. The most commonly used materials for this function are PEDOT (poly(3,4-ethylenedioxythiophene)), which is a conductive polymer material usually doped with PSS (poly(stryenesulfonate)), and F8T2 (poly(9,9-dioctylfluorenyl-2,7-dyl)-co-bithiophene)) or P3HT, both of which are semiconducting materials. P3HT has already been mentioned in connection with the active protection system. All three of these materials are readily deposited by inkjet techniques and are therefore particularly suitable for use in the present invention. A further semiconducting material, which has already been mentioned with regard to the active protection system, is pentacene.

The organic conductive layer is applied as a strip of material in a grid configuration over a part of the upper surface of the chip, which is not occupied by the active circuits described earlier. This strip is connected at its two ends to respective bond pads 224, 226, which in turn are connected to suitable control circuitry located on the chip. The control circuitry provides operating signals for at least indirectly assessing the properties of the organic layer.

Figure 9:
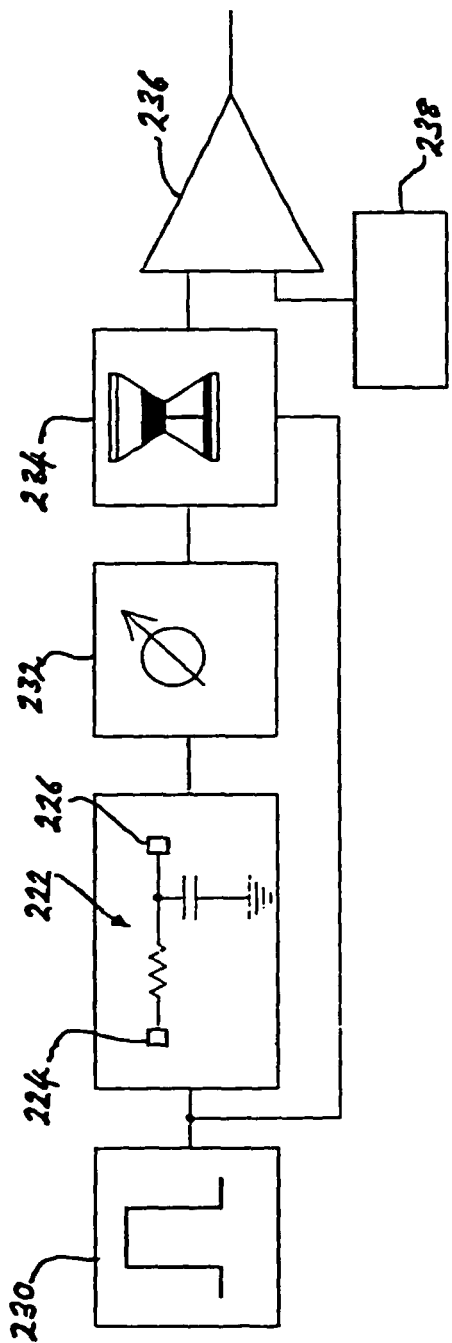
FIG. 9 is a block circuit diagram of a tamper-protection circuit employing the organic conductive layer illustrated in FIG. 7.

One way of at least indirectly assessing the properties of the organic conductive layer is to use the layer as an RC (resistor-capacitor) delay line and to have the control circuitry feed a pulse into one end of the delay line and measure the time it takes for the pulse to reach the other end. An alarm is triggered if the response time changes. Such a change in response time could result from a tampering attempt, which alters the electrical properties of the layer, and thereby the delay time. A block diagram of this control arrangement is shown in FIG. 9. In FIG. 9 a waveform generator 230 supplies a voltage or current pulse to the bond pad 224 shown in FIG. 8 and the voltage/current on the other bond pad 226 is monitored by a detector circuit 232. The protection layer 222 is shown in FIG. 9 as a simple RC network. A timer 234 is also provided, which is started by the appearance of the pulse from the waveform generator 230 and is stopped by the appearance of the delayed pulse as detected by the detector 232. The delay time measured by the timer is then compared in a comparator 236 with a predetermined reference delay value stored in a non-volatile memory 238, which is directly integrated in the chip circuitry in the form of an embedded non-volatile memory or ROM. The predetermined reference delay time is derived as part of a pre-characterization phase, already described in connection with the other embodiments. The memory is preferably of the write-once variety. If the two delay times are substantially identical, then the comparator outputs a "PASS" signal, otherwise a "FAIL" signal is output. These two signals are represented by a logic HIGH/LOW signal (in either order) at the output of the comparator.

Figure 10:
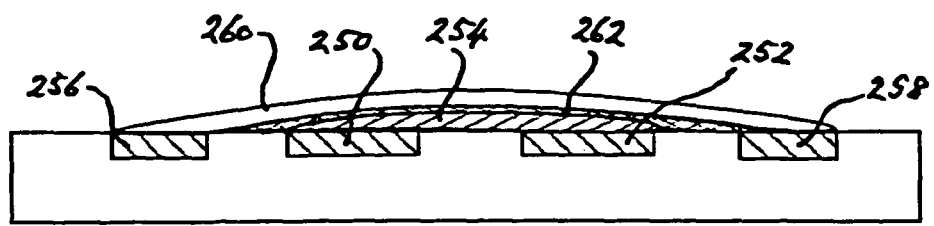
FIG. 10 is an example of a combined active and passive protection arrangement.

A specific example of a combined active and passive protection circuit is illustrated in FIG. 10. In FIG. 10 an OTFT structure is formed on the chip, comprising a source 250, a drain 252, a semiconductor channel 254 between the source and drain and a pair of gate contacts 256, 258, which are interconnected by a gate electrode 260. The gate electrode 260 is insulated from the source, drain and channel by a gate insulator layer 262. The gate electrode 260 is constituted by an organic conductive layer, and functions as a delay line having input and output terminals 256, 258. The channel 254 is formed in an organic semiconductor layer. In practice, layers 254 and 260 may be composed of the same material. In use, a voltage step is applied to gate terminal 256, and the voltage at gate terminal 258 is monitored, to determine the delay caused by the resistance and capacitance of the gate. A voltage is also applied between the source and drain contacts. As a result, the transistor becomes conductive, and a current will be measurable between source and drain contacts. The transistor continues to behave like a transistor, so this configuration may be used anywhere a transistor is indicated, that does not have its gate embedded in the smart card (e.g. the memory transistors). As mentioned in connection with the earlier embodiments, the delay time will first be measured in a pre-characterisation phase, and will be measured again each time the card is used. The re-measured delay values are checked against the stored characterisation value and, if these are significantly different, the usual alarm will be given and the card stopped.

Where a number of such transistor/delay-line arrangements are employed, the gate conductor layer 260 may be implemented as a single common gate layer. This assumes, of course, that the transistors in these arrangements are to be driven in tandem by the same drive signal.

Instead of, or as well as, employing protection circuits which are an intimate combination of active and passive circuits, such as shown in FIG. 10, the present invention also envisages employing separate active and passive circuits situated on different parts of the smart-card surface.

Returning to the active protection scheme, it is possible to form logic structures in the organic protection layer. However, such structures may have properties which render them relatively insecure. Thus, for example, implementing logic structures in the protection layer, rather than relying on the analogue characteristics of this layer in the manner outlined at the beginning, may well reduce the amount of information which can be collected. As the number of connection pads is limited, the number of possible mappings between input bits and output bits is limited. This makes it easier to carry out an attack, thereby compromising security, rather than enhancing it.

Organic transistors are still an emerging technology, with only a few mainstream applications. The embodiments described above are such that they can be implemented and verified using today's organic transistor technology. However, as the development of OTFTs continues, it will be possible to realize more complex circuits, which allow the protection layer to carry out more sophisticated tests. Thus, although, for example, with current technology it is difficult to implement sense amplifiers in the organic protection layer, which is desirable, it may well prove possible to do this in the future.

Compared with the Kömmerling patent mentioned earlier, the active sensor structures in the present invention are not implemented as part of the chip, but as part of the tamper-protection layer itself. Furthermore, the sensors are not intended to track the position or random distribution of particles in the packaging layer. Instead, they track the physical presence of the packaging layer, either by sensing a property of the packaging itself (which may include suitable volatile materials), or by sensing a property of the environment that is present when the packaging is removed—e.g., light, oxygen, nitrogen, etc The tamper protection layer of the present invention ensures that encryption keys can be stored safe from invasive attacks on the smart cards containing the chips, on which the protection layer is disposed.

Possible applications for the smart-card chip arrangement according to the present invention are, as already mentioned, smart cards for authorizing bank transactions, but also copy-protection devices, game cartridges, inkjet or laser printer cartridges, RFID tags, pay-TV decoder cards, phone cards, etc. All of these applications, and others not specifically mentioned here, are intended to come under the term "smart-card chip arrangement" used in this specification.

We claim:

1. A smart-card device, comprising:
 a smart-card chip including a first pad and a second pad; and
 a bridge circuit provided on the smart-card chip, the bridge circuit detecting a structural attack from outside of the smart-card device,
 the bridge circuit including a plurality of transistors, at least one of the plurality of transistors including:
 an organic semiconductor film coupled to the first and second pads;
 a gate electrode positioned between the chip and the organic semiconductor film; and
 a gate insulating film positioned between the organic semiconductor film and the gate electrode,
 the structural attack damaging the organic semiconductor film and thereby causing a change in an output signal of the bridge circuit.

2. The smart-card device according to claim 1, wherein a first organic semiconductor film, a first gate electrode and a first gate insulating film form a first transistor of the plurality of transistors, and the chip further including a third pad, the smart-card device further comprising:
 a second organic semiconductor film coupled to the second and third pads;
 a second gate electrode positioned between the chip and the second organic semiconductor film; and
 a second gate insulating film positioned between the second organic semiconductor film and the second gate electrode, wherein the second organic semiconductor film, the second gate electrode and the second gate insulating film form a second transistor of the plurality of transistors.

3. The smart-card device according to claim 2, the chip further including a fourth pad, a fifth pad and a sixth pad, the smart-card device further comprising:
 a third organic semiconductor film coupled to the fourth and fifth pads;
 a third gate electrode positioned between the chip and the third organic semiconductor film;
 a third gate insulating film positioned between the third organic semiconductor film and the third gate electrode;
 a fourth organic semiconductor film coupled to the fifth and sixth pads;
 a fourth gate electrode positioned between the chip and the fourth organic semiconductor film; and
 a fourth gate insulating film positioned between the fourth organic semiconductor film and the fourth gate electrode, wherein the third organic semiconductor film, the third gate electrode and the third gate insulating film form a third transistor of the plurality of transistors, and the fourth organic semiconductor film, the fourth gate electrode and the fourth gate insulating film form a fourth transistor of the plurality of transistors.

4. The smart-card chip device according to claim 3, the first gate electrode and the fourth gate electrode composing a first wiring, the second gate electrode and the third gate electrode composing a second wiring.

5. The smart-card device according to claim 4, the second pad being a first node having a first voltage.

6. The smart-card device according to claim 5, the fifth pad being a second node having a second voltage equal to the first voltage.

7. The smart-card device according to claim 5, the chip further including a comparator that inputs the first voltage of the first node and the second voltage of the second node.

8. The smart-card device according to claim 1, further comprising:
 an encapsulating material covering the organic semiconductor film of at least one of said plurality of transistors; and
 a volatile material positioned between the smart-card chip and the encapsulating material.

9. The smart-card device according to claim 1, further comprising:
 an encapsulating material covering the organic semiconductor film of at least one of said plurality of transistors; and
 a solvent positioned between the smart-card chip and the encapsulating material.

10. The smart-card device according to claim 1, further comprising:
 an encapsulation layer that overlaps the smart-card chip and the bridge circuit.

11. A smart-card chip device, comprising:
 a smart-card chip including a first pad, a second pad, a gate electrode and a gate insulating film;
 a source electrode formed on the chip, the source electrode being connected to the first pad;
 a drain electrode formed on the smart-card chip, the drain electrode being connected to the second pad; and
 a bridge circuit provided on the smart-card chip, the bridge circuit detecting a structural attack from outside of the smart-card chip device,
 the bridge circuit including a plurality of transistors, at least one of the plurality of transistors including a first organic semiconductor film positioned between the source and drain electrodes, and said gate electrode and gate insulating film, the structural attack damaging the organic semiconductor film and thereby causing a change in an output signal of the bridge circuit.

12. The smart-card chip arrangement according to claim 11, further comprising:

a second organic semiconductor film positioned between the source and drain electrodes.

* * * * *